(12) United States Patent
Wells

(10) Patent No.: US 6,972,543 B1
(45) Date of Patent: Dec. 6, 2005

(54) SERIES RESONANT INDUCTIVE CHARGING CIRCUIT

(75) Inventor: Brannon P. Wells, San Jose, CA (US)

(73) Assignee: Stryker Corporation, Kalamazoo, MI (US)

( * ) Notice: Subject to any disclaimer, the term of this patent is extended or adjusted under 35 U.S.C. 154(b) by 117 days.

(21) Appl. No.: 10/646,386

(22) Filed: Aug. 21, 2003

(51) Int. Cl.[7] .............................................. H01M 10/46
(52) U.S. Cl. .................................................... 320/108
(58) Field of Search ................................ 320/108, 137, 320/140, 142; 363/8, 170, 173

(56) References Cited

U.S. PATENT DOCUMENTS

| | | | | |
|---|---|---|---|---|
| 5,157,319 A | * | 10/1992 | Klontz et al. ............... | 320/108 |
| 6,040,680 A | | 3/2000 | Toya et al. | |
| 6,160,374 A | * | 12/2000 | Hayes et al. ................ | 320/108 |
| 6,343,021 B1 | * | 1/2002 | Williamson ................. | 363/163 |
| 6,498,456 B2 | * | 12/2002 | Ettes et al. ................. | 320/108 |

OTHER PUBLICATIONS

"Frequency Response," http://www.innovatis.com/design_center/frequency_response.htm. no date.*

* cited by examiner

*Primary Examiner*—Edward H. Tso
(74) *Attorney, Agent, or Firm*—Blakely, Sokoloff, Taylor & Zafman LLP

(57) ABSTRACT

An apparatus to charge a power supply inductively, with increased efficiency due to resonance, comprises an LC series resonance circuit formed by a capacitor and a primary inductive coil coupled in series with the capacitor, and a secondary inductive coil positioned such that power is inductively transferred from the primary coil to the secondary coil. The LC circuit has a natural resonant frequency, wherein the primary coil of the resonance circuit is coupled to receive power from a source oscillating at the natural resonant frequency. The secondary coil is further coupled to the power supply so that power induced in the secondary coil causes the power supply to be charged.

12 Claims, 1 Drawing Sheet

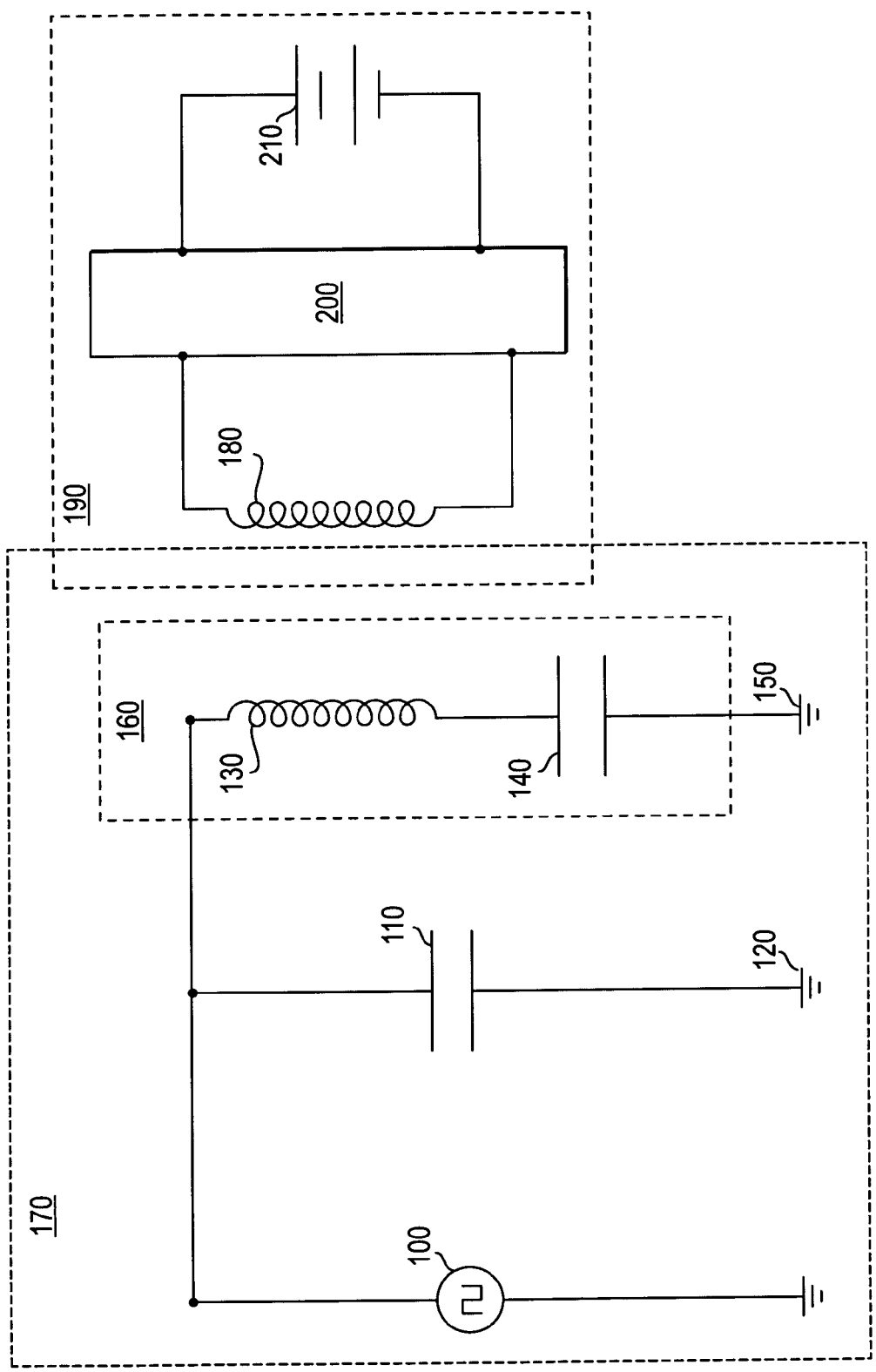
FIG.

SERIES RESONANT INDUCTIVE CHARGING CIRCUIT

FIELD OF THE INVENTION

At least one embodiment of the present invention pertains to inductive charging of a cordless electric device, and more particularly, to the use of an LC series resonance circuit used in a charging device in order to increase the efficiency of inductive power transfer between a primary and secondary inductor.

BACKGROUND

Many cordless electric devices use rechargeable batteries as a source of power. These batteries can be permanently contained within a cordless device, or included as a removable battery pack. To charge such batteries, power is normally transferred to the batteries by a conductive connection between the battery and a charging device.

Conductive charging of a battery can be disadvantageous, however, in certain environments, such as where fluids could come into direct contact with exposed electrical contacts. This condition could result in short circuiting, electrical shock to the user, fire and/or corrosion of the contacts. One example of a device that is subject to such an environment is a battery-powered cordless electric toothbrush, where problems could result if exposed electrical contacts were to come into direct contact with fluid.

Another method of charging a rechargeable battery or similar power source, which can be used to overcome the aforementioned problems, is electromagnetic induction. Through inductive charging, it is possible to transfer power from a charging device to a battery without the need for any direct electrical connection between the battery and the power source that charges it. Hence, there is no need for exposed electrical contacts for purposes of charging the battery.

Inductive charging typically uses two inductive coils, where a primary coil is contained within a separate charging unit connected to an AC wall socket and a secondary coil is contained within the cordless device and is connected to the battery. When the device is placed in the charging unit such that the two coils are in proximity to each other, power is inductively transferred from the primary coil (in the charging unit) to the secondary coil (in the cordless device). Circuits and techniques for inductively charging a rechargeable power supply are known and further described in various sources, such as in U.S. Pat. No. 6,040,680 of Toya et al.

One problem with inductive charging techniques of the prior art is inefficient power transfer, resulting in undesirably long charge times. One way to circumvent this problem would be through the use of a large amplifier in the charging unit in order to increase the inductive power transfer. However, such an approach tends to be more expensive, to require a larger charging device (to accommodate the amplifier), and to generate excessive heat and exacerbates electromagnetic compatibility (EMC) problems.

SUMMARY OF THE INVENTION

The present invention is an apparatus for charging a power supply. The apparatus comprises a resonance circuit formed by a capacitor and a primary inductor coupled to the capacitor. The primary inductor is coupled to receive power from a source oscillating at the natural resonant frequency of the resonance circuit. The apparatus further comprises a secondary inductor positioned such that power is transmitted from the primary inductor to the secondary inductor by induction. The secondary inductor is further coupled to the power supply so that power induced in the secondary inductor causes the power supply to be charged.

Other features of the present invention will be apparent from the accompanying drawings and from the detailed description that follows.

BRIEF DESCRIPTION OF THE DRAWING

One or more embodiments of the present invention are illustrated by way of example and not limitation in the figures of the accompanying drawings, in which like references indicate similar elements and in which:

The FIGURE illustrates a charging apparatus using induction to transfer power from a charging device to a rechargeable power supply.

DETAILED DESCRIPTION

A method and apparatus to inductively charge a power supply are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

As described in greater detail below, an apparatus in accordance with the present invention allows for inductively charging a rechargeable power supply with greater efficiency and reduced charging time than the prior art. As mentioned above, techniques for inductively charging a rechargeable battery are known, however such techniques in the prior art are limited due to inefficient power transfer resulting in long battery charge times. The present invention solves the above problem by taking advantage of the properties of series LC resonance to increase the efficiency of power transfer between the primary and secondary coils, which reduces battery charge time. The inclusion of a matched capacitor connected in series with the primary inductive coil allows for the increased efficiency of inductive power transfer between the two coils due to resonance. A key characteristic of the LC resonance circuit is that the natural resonant frequency of the circuit matches the frequency at which the input AC voltage source 100 oscillates.

The Figure shows a charging apparatus for inductively charging a battery according to the invention. A cordless electrically powered device 190 includes a secondary coil 180, a charging circuit 200 and a rechargeable power supply 210 (e.g., a battery). A charging unit 170 is provided in a separate housing and includes a first capacitor 110 and a series LC circuit 160. A first terminal of the capacitor 110 is connected to an input AC voltage source 100, which in certain embodiments generates a square wave. A second terminal of the capacitor 110 is connected to a reference point 120. It should be noted that capacitor 110 is not essential to the present invention, however, it tends to reduce EMC problems. The capacitor 110 is further connected in parallel with the series combination of a primary inductive coil 130 and a second capacitor 140, which form LC circuit 160.

When the device 190 is mounted in the charging unit 170 for charging, the secondary inductive coil 180 is positioned in proximity to the primary coil 130. First and second terminals of the secondary inductive coil 180 are connected respectively to first and second input terminals of a charging circuit 200 in the device 190. First and second output terminals of the charging circuit 200 are connected to positive and negative terminals, respectively, of the rechargeable power supply 210 in the device 190.

The AC voltage source 100 provides a low impedance path from the input of the LC circuit to ground or to $V_{max}$, depending on the state of the source wave. This is advantageous, because any series impedance would tend to reduce the resonance of the LC series resonance circuit.

The secondary inductive coil 180 is positioned such that, when cordless device 190 is appropriately mounted in charging unit 170, it receives power, through induction, from the primary inductive coil 130. As mentioned above, the secondary coil 180 is connected to the charging circuit 200. The charging circuit 200 controls the flow of power to the rechargeable power supply 210. Note that the details of the construction and functionality of the charging circuit 200 and rechargeable power supply 210 are application-dependent and are not germane to the present invention.

The LC circuit 160 is designed to have a natural resonant frequency substantially equal to the frequency at which the AC voltage source 100 oscillates. The natural resonant frequency, $f_r$, of a series LC circuit, such as LC circuit 160, is given as $f_r = 1/(2\pi\sqrt{(LC)})$. Thus, in the embodiment discussed above, L in the foregoing formula is the inductance value of primary coil 130 and C is the capacitance value of capacitor 140. However, due to the mutual inductance that is created due to the coupling of the secondary coil 180 (which can vary with distance between the two coils, 130 and 180 orientation and secondary coil capacitance), and the variation in the values of the primary coil 130 and capacitor 140, this frequency varies, and should be tuned for optimum results. In order to achieve the best power transfer, the LC circuit 160 should be tuned by measuring secondary power across the load at different frequencies around the calculated natural resonant frequency for the specific application load.

Thus, a method and apparatus to inductively charge a rechargeable power supply have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. An apparatus to charge a power supply, the apparatus comprising:
    a resonance circuit including a capacitor and a primary inductor coupled to the capacitor, the primary inductor further coupled to receive power from a an oscillating source, wherein the resonance circuit has a natural resonant frequency approximately equal to a frequency of the source; and
    a secondary inductor to receive power transmitted from the primary inductor by induction, the secondary inductor coupled to the power supply so that power induced in the secondary inductor causes the power supply to be charged.

2. An apparatus as recited in claim 1, wherein the capacitor and primary inductor are coupled in series.

3. An apparatus as recited in claim 1, further comprising a charging circuit coupled between the power supply and the secondary coil, the charging circuit to control the transfer of power to the power supply.

4. An apparatus as recited in claim 1, wherein the power supply is a rechargeable battery.

5. An apparatus as recited in claim 4, wherein the apparatus is contained within a housing configured to receive a portable cordless device that contains the rechargeable battery.

6. An apparatus to charge a power supply, the apparatus comprising:
    a source to generate an oscillating output at a frequency;
    a resonance circuit including a primary coil and a capacitor coupled in series with the primary coil, wherein the resonance circuit has a natural resonant frequency substantially equal to the frequency of the source, the primary coil further coupled to the source; and
    a secondary coil to receive power, through induction, from the primary coil, the secondary coil further coupled to the chargeable power supply to cause the chargeable power supply to be charged from the power induced in the secondary coil.

7. An apparatus as recited in claim 6, further comprising a charging circuit coupled between the power supply and the secondary coil, the charging circuit to control the transfer of power to the power supply.

8. An apparatus as recited in claim 6, wherein the power supply is a rechargeable battery.

9. An apparatus as recited in claim 8, wherein the apparatus is contained within a housing configured to receive a portable cordless device that contains the rechargeable battery.

10. A charging apparatus for charging a rechargeable battery, the charging apparatus comprising:
    a source generating an output oscillating at a frequency;
    an LC series resonance circuit coupled to receive the output of the source, the LC series resonance circuit including a primary coil and a capacitor coupled to the primary coil, wherein a first terminal of the capacitor is coupled to a first terminal of the primary coil and a second terminal of the capacitor is coupled to a reference point, a second terminal of the primary coil is coupled to the output of the source, the LC series resonance circuit having a natural resonant frequency substantially equal to the frequency of the output of the source;
    a secondary coil to receive power, through induction, from the primary coil, the secondary coil further coupled to the charging circuit to cause the rechargeable battery to be charged from the power induced in the secondary coil; and
    a battery charging circuit coupled between the secondary coil and the rechargeable battery to control charging of the rechargeable battery.

11. A charging apparatus as recited in claim 10, wherein the apparatus is contained within a housing configured to receive a portable cordless device that contains the rechargeable battery.

12. A charging apparatus as recited in claim 11, wherein the natural resonant frequency, $f_r$, of the LC series resonance circuit is characterized as $f_r = 1/(2\pi\sqrt{(LC)})$, where L is an inductance value of the primary coil and C is a capacitance value of the capacitor.

* * * * *